United States Patent [19]

Tanaka et al.

[11] Patent Number: 4,799,143
[45] Date of Patent: Jan. 17, 1989

[54] NC DATA CREATION METHOD

[75] Inventors: Kunio Tanaka; Takashi Takegahara; Yasushi Onishi, all of Tokyo, Japan

[73] Assignee: Fanuc Ltd., Minamitsuru, Japan

[21] Appl. No.: 43,347

[22] PCT Filed: Jul. 21, 1986

[86] PCT No.: PCT/JP86/00382
§ 371 Date: Mar. 23, 1987
§ 102(e) Date: Mar. 23, 1987

[87] PCT Pub. No.: WO87/00652
PCT Pub. Date: Jan. 29, 1987

[30] Foreign Application Priority Data

Jul. 22, 1985 [JP] Japan .................. 60-161574

[51] Int. Cl.⁴ .............................. G05B 19/00
[52] U.S. Cl. .................. 364/191; 364/474.2
[58] Field of Search .................. 364/188–191, 364/167–171, 474, 475, 184

[56] References Cited

U.S. PATENT DOCUMENTS 4,513,366  4/1985  Otsuki ............... 364/184 X
4,646,247  2/1987  Munekata et al. ........ 364/184 X Primary Examiner—Jerry Smith
Assistant Examiner—Allen MacDonald
Attorney, Agent, or Firm—Staas & Halsey

[57] ABSTRACT

An NC data creation method in an automatic programming apparatus in which NC data are created for moving a tool, after the tool has completed the machining of a first area (AR1), to a second area (AR2) to perform predetermined machining at the second area. The method includes checking whether an auxiliary position input mode has been set. If auxiliary position input mode has not been set, then temporarily haling automatic creation of NC data, thereafter inputting auxiliary positions (PA1, PA2) conversationally, and creating NC data for moving the tool to the second area via the inputted auxiliary positions.

7 Claims, 5 Drawing Sheets

NC DATA CREATION METHOD

BACKGROUND OF THE INVENTION

This invention relates to a method of creating NC data in an automatic programming apparatus and, more particularly, to an NC data creation method so adapted that a tool can be made to avoid striking an obstacle if one is present on a tool travel path generated in accordance with a predetermined rule.

There are cases where a tool, after completing the machining of a first area, is moved to a second area to subsequently perform predetermined machining at the second area. For example, as shown in FIG. 5(A), there are cases where hole machining of a prescribed type is performed at a first area AR1, after which the tool used at the first area AR1 is moved as is (i.e. without being exchanged for another) to a second area AR2, where hole machining of another type is then carried out. In such cases, the tool must be moved from the first area AR1 to the second area AR2. In the prior art, this is accomplished by previously deciding the position of an approach surface APS in the height direction (Z direction), retracting the tool to the approach surface APS after is has completed cutting a final hole H12 at the first area AR1, thenceforth moving the tool on the approach surface to a point directly above an initial hole H21 at the second area AR2, then causing the tool to approach the initial hole and subsequently cutting a hole at the second area. In FIG. 5(A), WK represents the workpiece in which the holes are formed, H11, H12 ... denote the holes in the first area AR1, and H21, H22 ... denote the holes in the second area.

There are situations where an obstacle is present on the tool travel path between the first area AR1 and second area AR2. For example, as shown in FIG. 5(B), a portion of the workpiece WK may protrude beyond the approach surface APS between the first area AR1 and second area AR2. If the tool path is decided in accordance with the conventional method in such situations, the tool will strike the protuberance when it attempts to move from the first area AR1 to the second area AR2.

SUMMARY OF THE INVENTION

Accordingly, an object of the present invention is to provide an NC data creation method so adapted that a tool will not strike an obstacle if one lies on the tool travel path.

Another object of the present invention is to provide an NC data creation method in which, by previously establishing an auxiliary position input mode, processing for creating NC data automatically can be temporarily halted prior to the creation of NC data for the approach from a first area to a second area.

A further object of the present invention is to provide an NC data creation method in which, by previously establishing an auxiliary position input mode, processing for creating NC data automatically can be temporarily halted prior to the creation of NC data for the approach from a first area to a second area, after which NC data are created upon setting, in a conversational input mode, a tool travel path that will not result in a collision with an obstacle. To achieve the above and other objects, the present invention provides an NC data creation method in an automatic programming apparatus in which NC data are created for moving a tool, after the tool has completed the machining of a first area, to a second area to perform predetermined machining at the second area. The NC data creation method includes:

a step of checking whether an auxiliary position input mode has been set in creating NC data for moving a tool from a first area to a second area;

a step, executed if the auxiliary position input mode has not been set, of creating NC data for moving the tool from the first area to the second area along an approach surface a predetermined height above a workpiece; and a step, executed if the auxiliary position input mode has been set, of temporarily halting processing for automatic creation of NC data, thereafter inputting an auxiliary position conversationally, and creating NC data for moving the tool to the second area via the inputted auxiliary position.

DESCRIPTION OF THE PREFERRED EMBODIMENT

Figure 1A:
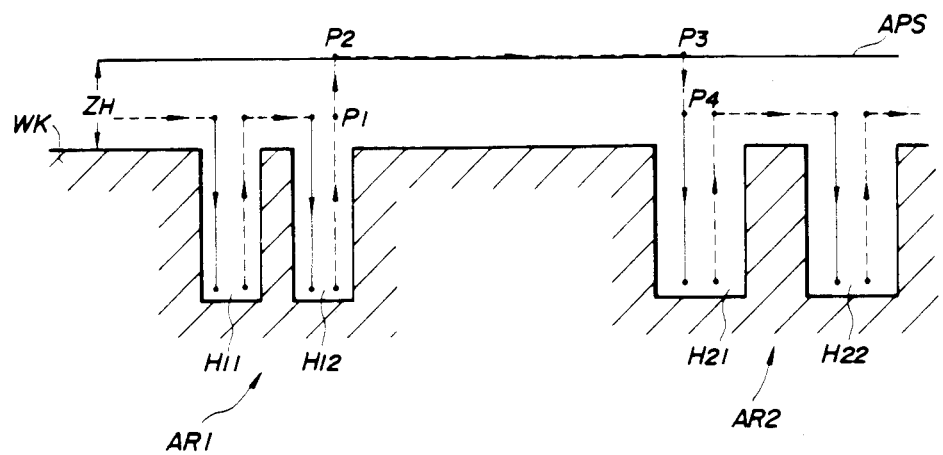
FIGS. 1(A) and 1(B) are views for describing the general features of the present invention.
Figure 1B:
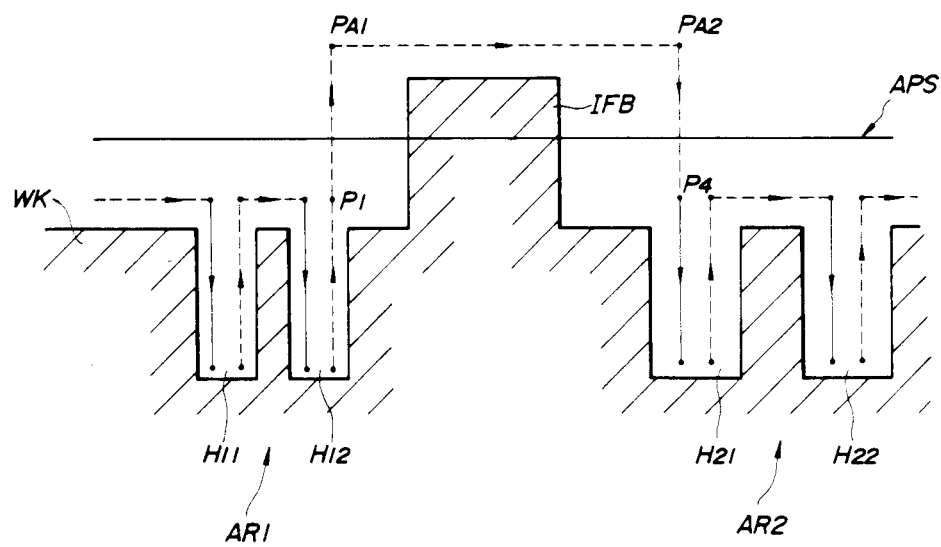

FIGS. 1(A) and 1(B) are views for describing the general features of the present invention, in which AR1 and AR2 represent first and second areas, respectively, WK represents a workpiece, Hij a hole, APS an approach surface, IFB a workpiece protuberance constituting an obstacle, and PA1, PA2 auxiliary positions.

Before NC data are created for moving the tool from the first area AR1 to the second area AR2, a check is performed to determine whether the prevailing mode is an auxiliary position input mode.

If the mode that prevails is not the auxiliary position input mode, then NC data are created in accordance with a predetermined rule, or in other words, for retracting the tool to the approach surface APS (point P2) from the final hole H12 (point P1) of the first area AR1, then moving the tool on the approach surface from the first area AR1 to a point (P3) directly above an initial hole H21 of the second area AR2, and thereafter causing the tool to approach the vicinity (point P4) of the initial hole H21 of the second area AR2 [see FIG. 1(A)].

If the prevailing mode is the auxiliary position input mode, on the other hand, then the auxiliary positions PA1, PA2 [see FIG. 1(B)] are inputted conversationally so that the tool will not strike the obstacle (protuberance) IFB in moving from the first area AR1 to the second area AR2.

Therafter, NC data are created for moving the tool to the second area AR2 via the inputted auxiliary positions PA1, PA2 (P1→PA1→PA2→PA4).

Thus, in a case where the tool would strike the obstacle IFB if NC data for moving the tool from the first area AR1 to the second area AR2 were to be generated automatically and the tool moved in accordance with these NC data, the auxiliary position input mode is established at the creation of the NC data. As a result, processing for the automatic creation of the NC data is temporarily halted prior to the creation of the NC data for movement from the first area AR1 to the second area AR2. Accordingly, the auxiliary positions PA1, PA2 are subsequently inputted conversationally to set a tool travel path that will not result in a collision with the obstacle IFB.

Figure 2:
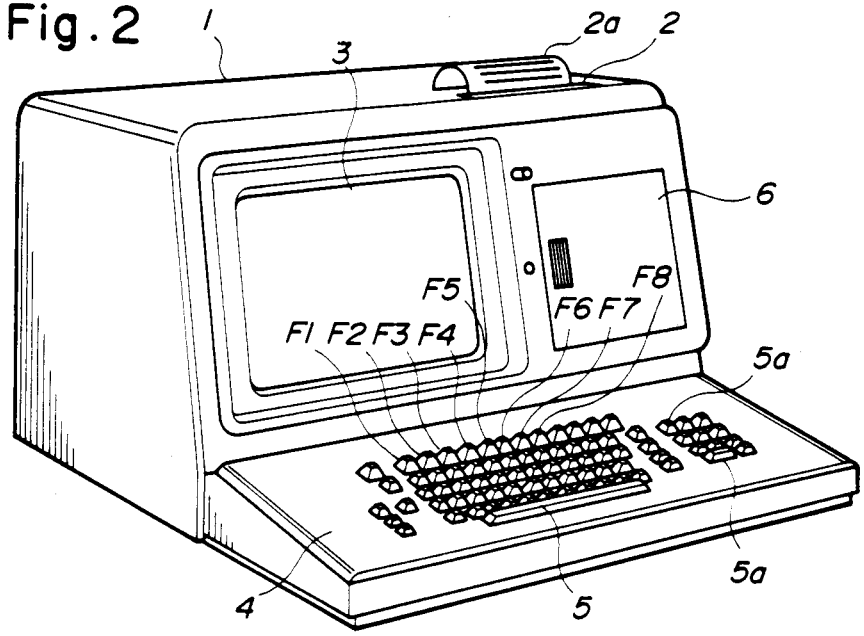
FIG. 2 is a perspective view showing the external appearance of an automatic programming apparatus for realizing the present invention.

FIG. 2 is a perspective view showing the external appearance of an automatic programming apparatus for the automatic creation of NC data. A main frame 1 has a top side provided with a printer 2 and a front side provided with a CRT display unit 3. Disposed in front of the CRT display unit 3 is a keyboard 4 on which there are provided an array of keys 5 such as character keys, numeric keys and function keys F1–F8. Disposed at the side of the CRT display unit 3 is a magnetic storage device 6 such as a floppy disc unit. Numeral 2a denotes a recording paper on which printing is performed by the printer 2.

Figure 3:
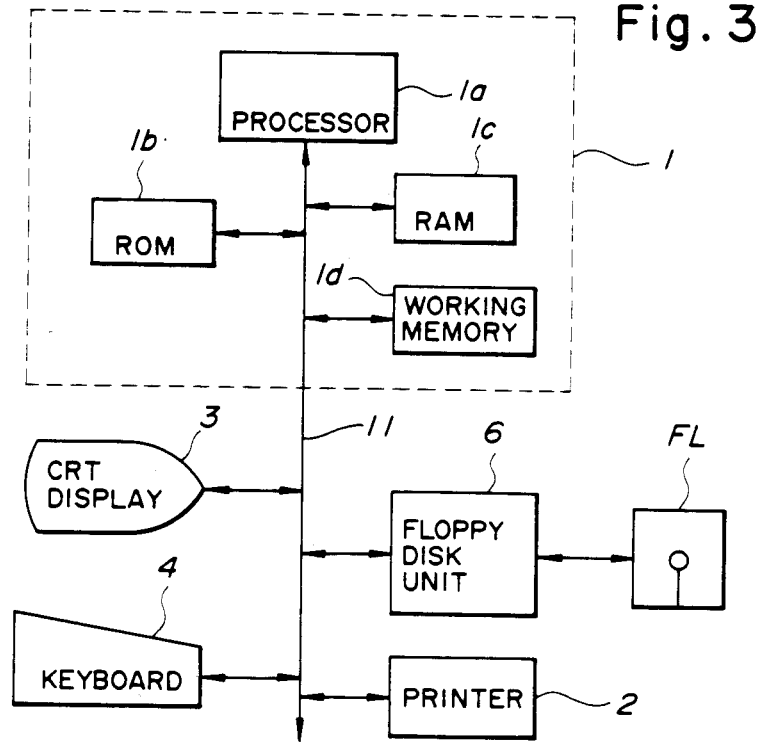
FIG. 3 is a block diagram of the automatic programming apparatus.

FIG. 3 is a block diagram of the automatic programming apparatus for realizing the present invention. Portions similar to those in FIG. 2 are designated by like reference characters. As shown in FIG. 3, the main frame 1 has a processor $1a$, a ROM $1b$, a RAM $1c$ and a working memory $1d$. The main frame 1, printer 2, CRT display unit 3, keyboard 4 and magnetic storage device 6 are interconnected by a bus line 11.

In accordance with this automatic programming apparatus, questions appear on the display screen so that a programmer is capable of inputting the required data while, in effect, conversing with the display screen. Accordingly, NC data such as that for drilling holes can be created from a design drawing through a simple operation.

Figure 4A:
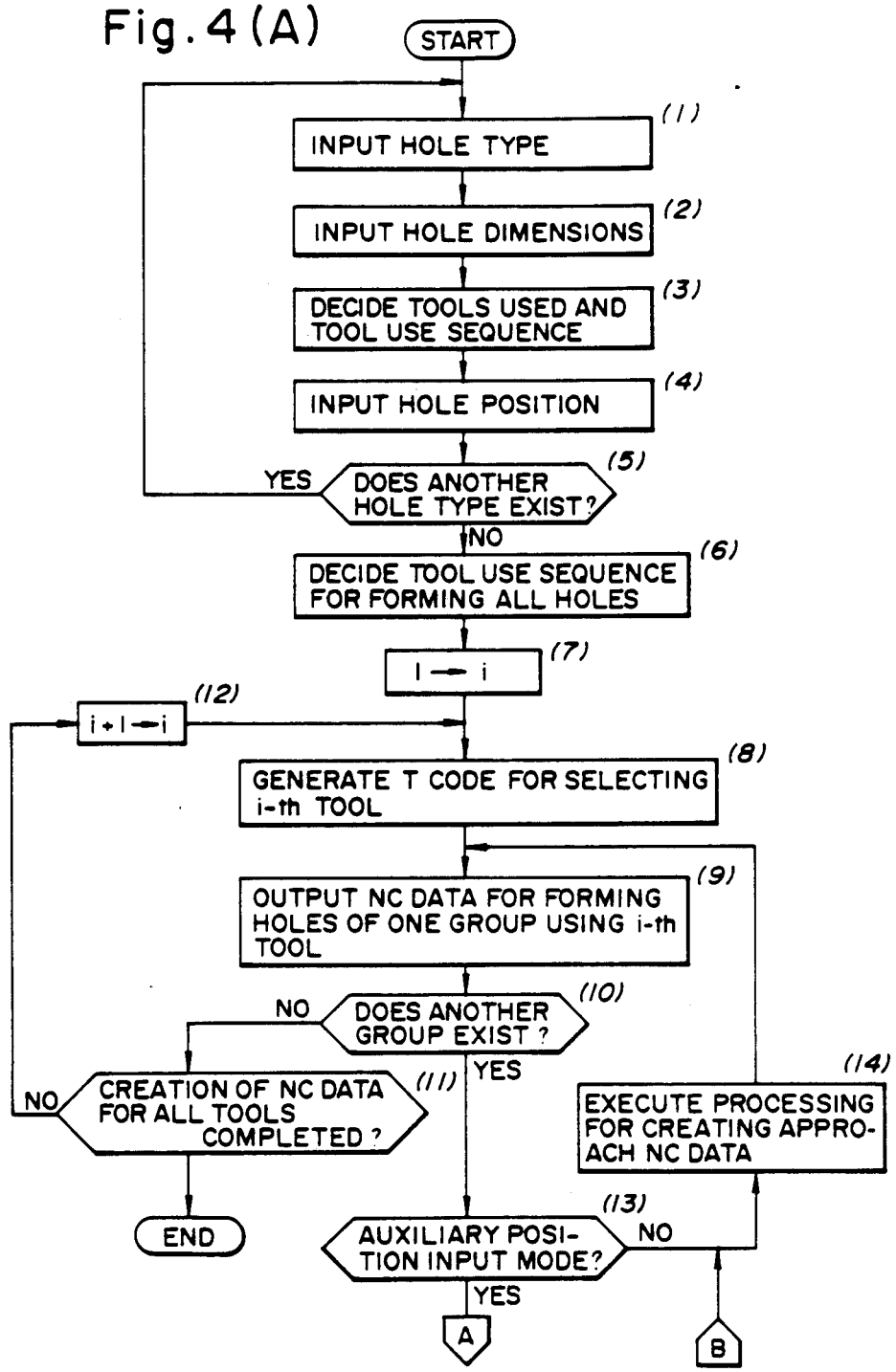
FIGS. 4(A) and 4(B) illustrate a flowchart of processing according to the present invention.
Figure 4B:
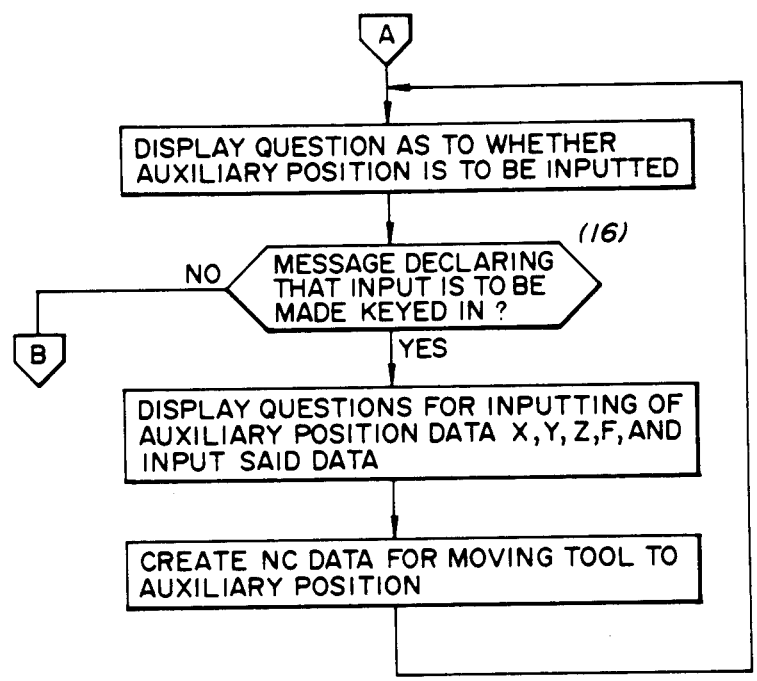
Figure 5A:
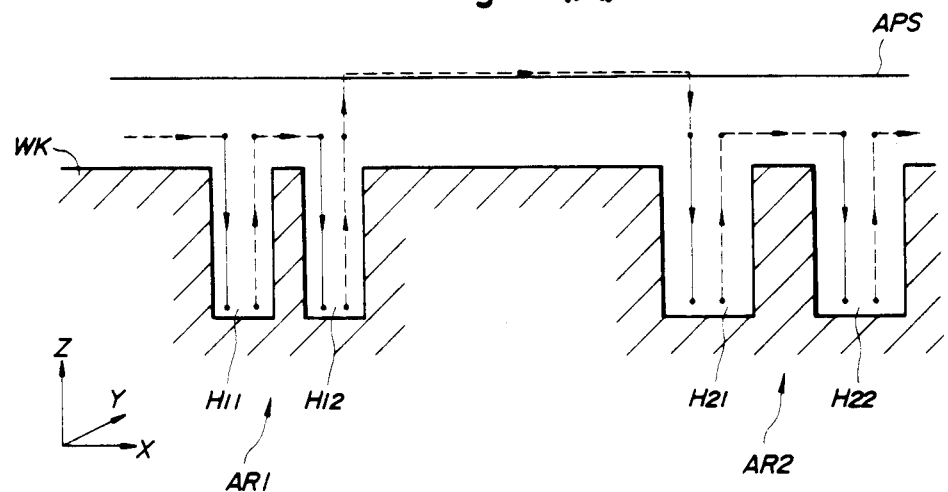
FIGS. 5(A) and 5(B) are views for describing the conventional method.
Figure 5B:
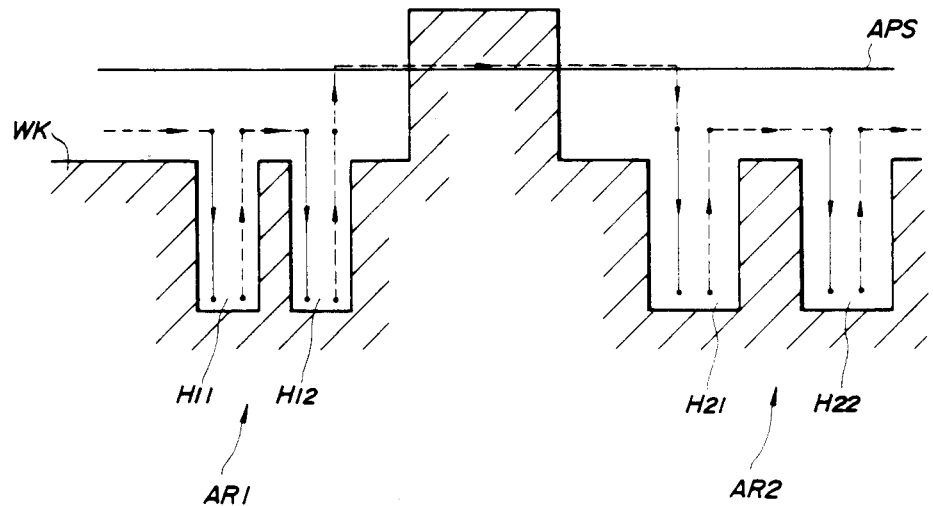

The method of creating NC data according to the present invention will now be described while referring to the flowchart of FIGS. 4(A) and 4(B). For illustration purposes only, the description is premised on creation of NC data (an NC tape) for drilling holes.

In the execution of automatic programming, a floppy disc FL (see FIG. 3) storing a system program for creating a hole-drilling NC program is set in the magnetic storage device (floppy disk unit) 6. Next, a loading program stored in the ROM $1b$ is started to load the system program in the RAM $1c$. This enables the creation of the hole-drilling NC program.

(1) As processing proceeds, a hole-type input step is reached, whereupon various hole names, such as a drilled hole, reamed hole, tapped hole and bored hole are displayed along with menu numbers. A question regarding hole type is also displayed. The programmer responds to the question by using the keyboard 4 to input, in the form of a menu number, the type of hole to be formed.

(2) When the type of hole has been inputted, a question regarding the dimensions of the hole is displayed on the display screen. For example, if the type of hole is the drilled hole, questions regarding hole diameter D, hole depth L and chamfer data CH for the purpose of specifying the drilled hole are displayed together with a graphic of the drilled hole. In response, the required data are inputted from the keyboard in accordance with the questions displayed.

(3) When the input of hole dimensions ends, the processor $1a$ uses the inputted data and a tooling file (stored in RAM $1c$) contained in the system program to automatically decide the tools, as well as the sequence of their use, employed in cutting the hole of the type specified in step (1). A method of automatically deciding the tools used is not central to the present application and a detailed description thereof is omitted. For the details, however, reference should be had to e.g. the specification of Japanese patent application No. 60-117259 laid open on Dec. 5, 1986 as Japanese patent laid-open No. 61-274842 entitled "Automatic Deciding Method of Tool for Boring".

It should be noted that it is also permissible to adopt an arrangement in which the programmer inputs the tools used and the tool use sequence.

(4) When the processing for deciding the tool used and the tool use sequence ends, the processor causes the CRT display unit 3 to display questions for specifying the positions of all holes having the same shape as that of the hole specified in steps (1) and (2).

If the manner in which the holes are arrayed possesses regularity, the programmer uses this regularity to input the positions of all of the holes. If there is no such regularity, the programmer inputs the holes one at a time. The regularity mentioned here refers to a case where the holes are arranged at predetermined intervals in e.g. a grid-like pattern.

Thus, hole dimensions for a first group of holes, the sequence in which the tools are used, and the positions of all holes constituting the first group are stored in the working memory $1d$.

(5) The processor $1a$ then causes the CRT display unit to display the names of hole types and their menu numbers to invite the input of the next hole type. If the type of the next hole to be formed differs from the former, processing is repeated from step (1) onward. In this way hole dimensions for a second group of holes, the sequence in which the tools are used, and the positions of all holes constituting the second group are stored in the working memory $1d$.

By repeating the processing of step (1) through (5) for each and every type of hole, hole dimensions, tool use sequence and positions of all holes constituting a group are stored, group-by-group, in the working memory $1d$. It should be noted that the area in which each group of holes resides is assumed to be separated from areas in which other groups of holes exist.

(6) When processing for specifying all holes to be formed ends, a tool use sequence $T_1 \rightarrow T_2 \rightarrow T_3 \rightarrow \ldots \rightarrow T_i \rightarrow T_{i+1}$ for forming all of the holes is decided upon taking into consideration the tool number $T_i (i=1, 2, \ldots)$ used in each group as well as the tool use sequence for each group.

The reason for this is that since a tool used in forming the holes of a certain group may also be used to form the holes in another group, the number of tool changes can be reduced to shorten machining time if an appropriate tool use sequence is decided. For a method of deciding such a tool use sequence, refer to the specification of Japanese patent application No. 60-92911 laid open on Nov. 8, 1986 as Japanese Patent laid-open No. 61-251908 entitled "NC Program Creation Method for Boring" (which corresponds to International Application PCT/JP86/00206).

(7) When the tool use sequence has been decided in the above manner, the processor $1a$ performs the operation $1 \rightarrow i$.

(8) Next, the processor $1a$ generates a tool change instruction (T code) for selecting the i-th used tool $T_i$.

(9) This is followed by creating NC data for retrieving one group that employs the i-th tool $T_i$, for positioning the i-th tool successively at all hole positions in the group, and for forming the holes.

(10) When the creation of hole-drilling NC data using the i-th tool $T_i$ ends for the one group, the processor performs a check to determine if another group using the i-th tool exists.

(11) If such a group does not exist, a check is performed to determine whether processing for creating NC data has been completed for all tools. If it has, NC data creation processing ends.

(12) If NC data processing has not been completed for all tools, on the other hand, then the processor increments i by performing the operation $i+1 \rightarrow i$ and then repeats processing from step (8) onward.

(13) If another group using the i-th tool $T_i$ is found to be present in step (10), a check is performed to determine whether the auxiliary position input mode is in effect.

To establish the auxiliary position input mode, use is made of a prescribed function key (e.g. function key F5 in FIG. 2). Specifically, the function key F5 is a locking-type key having a lamp. If it is desired to establish the auxiliary position input mode, therefore, the function key is placed in the depressed state (in which state the lamp lights). If one wishes to cancel the auxiliary position input mode, the function key is released from the depressed state.

(14) If the auxiliary position input mode is not in effect, the processor 1a creates NC data for retracting the i-th tool, in rapid-traverse, from the present position P1 [see FIG. 1(A)] to the approach surface APS (point P2), for moving the i-th tool along the approach surface to a point (P3) directly above the initial hole H21 of the other group mentioned above, and for subsequently causing the i-th tool to approach the point P4. It should be noted that the approach surface APS is set at a position a prescribed height $Z_H$ from the workpiece surface.

The above represents processing for creating approach NC data.

When approach NC data creation processing ends, processing from step (9) onward is repeated.

(15) If the auxiliary position input mode is found to be in effect in step (13), the processor 1a causes the CRT display unit 3 to display a question as to whether an auxiliary position is to be inputted.

(16) If the programmer declares that an auxiliary position is not to be inputted by pressing an NL key (new-line key) 5a (FIG. 2) on the keyboard 4, then the processor 1a executes processing from step (14) onward.

(17) However, if the programmer declares that an auxiliary position is to be inputted by pressing a numerical value "1" key 5b and the NL key 5a consecutively, then the processor 1a causes the CRT display unit 3 to display questions regarding three dimensional coordinates X, Y, Z of the auxiliary position as well as traveling velocity F to the auxiliary position. Accordingly, the programmer responds to these questions by successively inputting the coordinate of the auxiliary position PA1 [see FIG. 1(B)] along each axis as well as the velocity.

(18) When the coordinates and traveling velocity concerning the auxiliary position PA1 have been entered, the processor 1a creates NC data for bringing the tool into position at the auxiliary point PA1 from the present position (e.g. point P1), then jumps to step (15) to display a question as to whether a second auxiliary position is to be inputted, and thereafter repeats the ensuing processing. In the case of FIG. 1(B), the coordinates of the second auxiliary position PA2 and the associated traveling velocity are thenceforth specified in a manner similar to that above, and NC data are created for bringing the i-th tool $T_i$ into position at the second auxiliary position PA2 from the first auxiliary position PA1. Then, at step (14), approach data are created for causing the tool to approach the point P4 from the second auxiliary position PA2.

Though the foregoing description deals with a case in which the invention is applied to the creation of NC data for forming holes, the invention is not limited to hole formation.

Thus, in accordance with the present invention, the arrangement is such as to check whether an auxiliary position input mode has been set in creating NC data for moving a tool from a first area to a second area, create NC data automatically, in accordance with a predetermined rule, for moving the tool from the first area to the second area if the auxiliary position input mode has not been set, and create NC data for moving the tool to the second area via an auxiliary position which has been inputted conversationally, if the auxiliary position input mode is in effect. Therefore, if the tool would strike an obstacle when moved from the first area AR1 to the second area AR2 on the basis of the NC data created automatically, the processing for automatic creation of the NC data can be temporarily halted, prior to the creation of the NC data for the approach from the first area to the second area, by establishing the auxiliary position input mode. When the processing has thus been halted, a tool travel path with which the obstacle will not interfere can be set in a conversational manner.

We claim:

1. An NC data creation method in an automatic programming apparatus having an auxiliary position input mode and in which NC data is created for moving a tool, after the tool has completed machining a first area of a workpiece, to a second area to subsequently perform predetermined machining at said second area, said method including the steps of:
    (a) determining if the auxiliary position input mode has been set;
    (b) creating NC data in accordance with a predetermined rule for moving the tool from the first area to the second area if the auxiliary position input mode has not been set;
    (c) initiating reception of an auxiliary position if the auxiliary position input mode has been set; and
    (d) creating NC data for moving the tool to said second area via the auxiliary position if the auxiliary position input mode has been set.

2. An NC data creation method according to claim 1, wherein step (b) comprises the substep of:
    creating the NC data for moving the tool from the first area to the second area by using an end point of the first area, a starting point of the second area, and said predetermined rule.

3. An NC data creation method according to claim 2, wherein said predetermined rule includes the step of:
    specifying a tool path from the first area to the second area such that said tool path includes a path along which the tool is moved from the first area to the second area at a prescribed height above the workpiece.

4. An NC data creation method according to claim 3, wherein said predetermined rule further includes the steps of:

defining a first tool path from the end point of the first area to a first point at the prescribed height ;

defining a second path from the first point to a second point at the prescribed height; and defining a third path from the second point to the starting pont of the second area.

5. An NC data creation method according to claim 2, further including the steps of:

determining if the auxiliary position is to be received; and creating NC data, in accordance with said rule, for moving the tool from the first area to the second area if the auxiliary position is not to be received.

6. An NC data creation method according to claim 5, wherein step (d) further including the substep of:

if the auxiliary position is to be inputted, receiving the auxiliary position conversationally.

7. An NC data creation method according to claim 1, wherein the automatic programming apparatus includes a function key and said method further includes the steps of:

providing the auxiliary position input by using the function key.

* * * * *